June 13, 1950     H. M. STEPHENSON     2,511,678
DRIVING MECHANISM
Filed Dec. 12, 1945
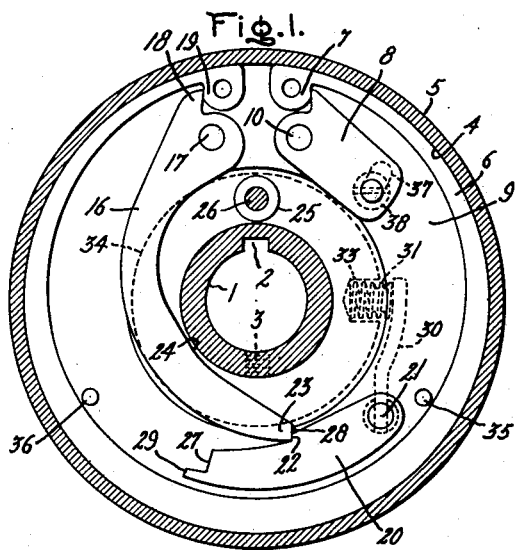
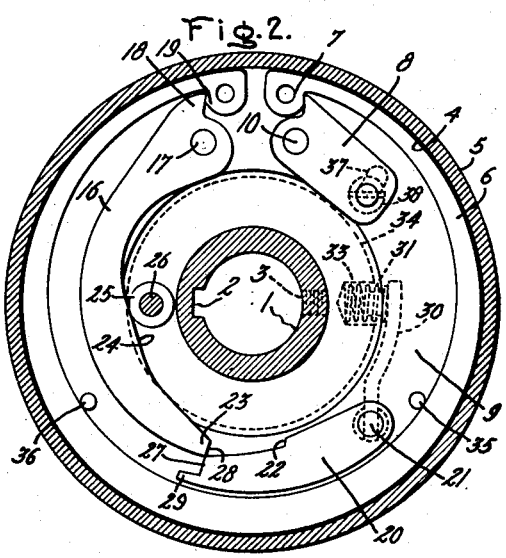
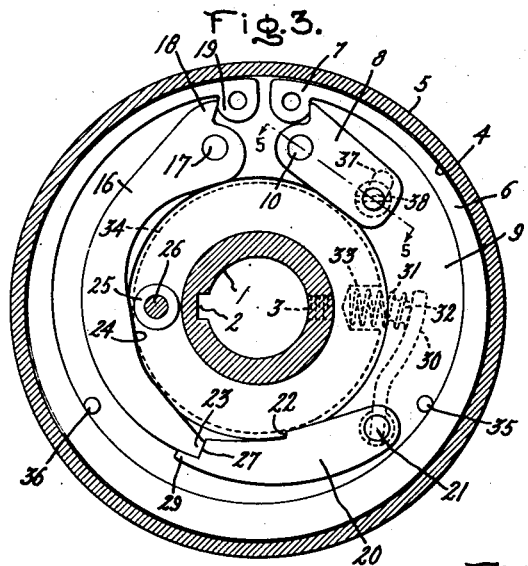
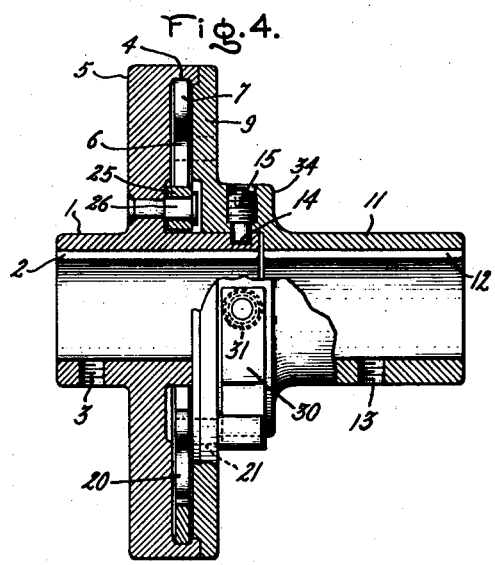
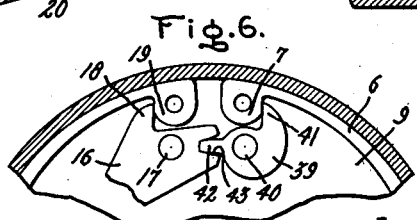
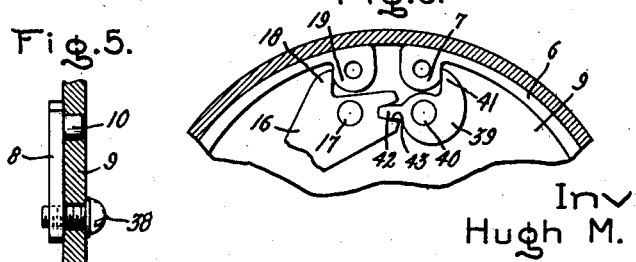
Inventor
Hugh M. Stephenson,
by
His Attorney.

Patented June 13, 1950

2,511,678

UNITED STATES PATENT OFFICE 2,511,678

DRIVING MECHANISM

Hugh M. Stephenson, Fort Wayne, Ind., assignor to General Electric Company, a corporation of New York Application December 12, 1945, Serial No. 634,590

23 Claims. (Cl. 192—56)

My invention relates to a driving mechanism and in particular to an arrangement which is adapted to provide a release of the driving connection above a predetermined torque and to prevent the reengagement of the driving connection except by a manual resetting thereof.

An object of my invention is to provide an improved driving mechanism for coupling together driving and driven members.

Another object of my invention is to provide an improved driving mechanism with an arrangement for disengaging the driving connection between driving and driven members above a predetermined torque and for preventing reengagement of the driving connection except by manual reset thereof.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a sectional end view of a driving mechanism illustrating one embodiment of my invention with the mechanism in frictional driving position; Fig. 2 is a sectional end view similar to Fig. 1 illustrating the mechanism at the time that the frictional driving connection is in the process of being released; Fig. 3 is a sectional end view similar to Figs. 1 and 2 in which the mechanism is shown in the fully released position of the frictional driving connection; Fig. 4 is a partial sectional side elevational view of the mechanism shown in Figs. 1, 2, and 3; Fig. 5 is a sectional view taken along line 5—5 of Fig. 3; and Fig. 6 is a partial end view of a driving mechanism similar to that in the other figures of the drawing showing another embodiment of a part of the driving mechanism release members.

Referring to the drawing, I have shown in Figs. 1 to 5, inclusive, an embodiment of my improved driving mechanism in connection with two drive members which are adapted to be connected together through a frictional driving connection. Either one of the two drive members may be used as the driven and the driving member, and for purposes of illustration, the drive will be assumed to pass specifically from one of these members to the other in order to facilitate the description of this mechanism. In this construction, the driving member includes a hub 1 which is adapted to be secured to a suitable source of power, such as a drive shaft, and to be connected thereto in any suitable manner, as by a key arranged in a keyway 2 or by a setscrew which may threadedly engage the hub 1 and be screwed into binding engagement with the surface of the drive shaft. A suitable driving surface is provided by a groove 4 formed on the inner side of a drum portion 5 which is secured to the hub 1, as by being made an integral part thereof, and an arcuate spring 6 is arranged in frictional engagement with the surface 4 of the drum. In order to provide for substantially equal frictional forces between the drum surface 4 and the spring 6 throughout the periphery of the engaging surfaces, this spring is formed with a radial width which varies inversely with the circumferential distance from the midpoint circumferentially of the spring, providing for the maintenance of a substantially circular external surface of the spring during expansion and contraction thereof, and thereby maintaining substantially uniform pressure of the spring upon the friction surface 4 of the drum 5. A mechanical driving connection is provided between the spring 6 and the driven member of this connection by engagement of a driving projecting end 7 on one end of the spring 6 with a driving element 8 which is formed as a stop and mounted on a driven member plate portion 9 by a pivotal connection 10. The driven member is provided with a hub portion 11 which is adapted to be arranged over any suitable driven shaft and connected thereto through a suitable key which is adapted to extend into a keyway 12 in the hub 11 and may also be secured to the driven shaft by a suitable setscrew arranged in threaded engagement with an opening 13 formed in the hub 11 and screwed into engagement with the surface of the shaft. In addition, a groove 14 is formed in the outer surface of an extension of the hub 1 which is arranged telescopically within a portion of the hub 11, and a guide pin 15 is secured in the hub 11 by threaded engagement with an opening therein and extends into the groove 14 to prevent axial dislocation between the driving and driven members. In order to disassemble this driving mechanism, it is necessary first to remove this pin 15 to provide for axially pulling apart the driving and driven members. As shown in Figs. 1 and 4, a driving connection is provided between the driving member and the driven member through the arcuate spring 6 by the frictional engagement of the outer surface of this arcuate spring 6 with the friction surface 4 of the driving member drum 5 and by the positive mechanical engagement of the driving projection 7 on one end of the spring 6 in engagement with a finger on the stop member 8 which is mounted on the driven member.

When the load torque transmitted through the frictional driving connection exceeds a predetermined value, slippage will occur between the drum frictional surface 5 and the spring 6, and it is desirable that a release mechanism should be provided to prevent the generation of excessive temperatures due to this slippage between these members. In this illustrated construction, a trigger member 16 is pivotally mounted by a suitable pin 17 on the driven member and is formed with an engaging finger element 18 arranged in direct mechanical engagement with a driving projecting element 19 formed on the other end of the spring 6 and spaced circumferentially from the driving projection 7 of the spring. During normal operating conditions, this trigger 16 forms no part of the driving mechanism and is held out of frictional engagement with the hub 1 of the driving member by a latching mechanism which includes a member 20 pivotally mounted by a suitable pivot pin 21 on the driven member plate 9. This latching member 20 is formed with a step 22 on the inner surface thereof which is adapted to engage the end 23 of the trigger 16 to hold the inner surface 24 of the trigger 16 out of engagement with the hub 1. If the torque transmitted through the frictional driving connection exceeds a predetermined value, slippage occurs between the drum 5 and the spring 6, causing relative movement between the driving and driven members, and an actuating element which is shown formed as a roller 25 rotatably mounted on a suitable pin 26 secured to the driving member drum portion 5 rotates with the driving member from a position such as that shown in Fig. 1 into engagement with the under surface 24 of the trigger 16, as shown in Fig. 2, thereby turning the trigger 16 in a clockwise direction, as seen in this figure, about its pivotal support 17. This compresses the arcuate spring 6 out of frictional engagement with the driving member drum surface by biasing the ends of the arcuate spring towards each other through the clockwise movement of the trigger finger 18 on the projection 19 of the spring, thus releasing the frictional driving engagement between the spring and the driving member drum. In many installations, it is desirable that the driving connection should not be reestablished except by manual resetting of the driving mechanism. This is provided for in this embodiment of my invention by providing an angularly arranged cam surface 27 on the latching member 20 which is adapted to engage a complementary camming surface 28 on the end 23 of the trigger 16 for further biasing the trigger 16 outwardly out of engagement with the roller 25 to a position such as that shown in Fig. 3. A stop 29 is formed on the end of the latching member 20 to prevent further outward movement of the trigger 16 and to hold the trigger 16 and the latching member 20 in the positions shown in Fig. 3. This camming action is facilitated by the provision of a resilient spring biased reset device including a member 30 which is suitably secured as by a key or extension into a slot in the end of the latching finger pivot pin 21 and is biased in a clockwise direction around the pivot pin 21 by a coil spring 31 arranged in compression between a spring seat 32 on the finger 30 and the bottom of a recess 33 formed in a shoulder 34 on the driven member hub 11, thereby assisting in latching the arcuate spring 6 in its compressed position out of engagement with the friction surface 4 of the driving member drum portion 5. This resetting device is so constructed that when it is desired to reestablish the frictional engagement between the spring 6 and the surface 4 of the drum 5, the spring biased end of the reset finger 30 may be pressed inwardly, thereby rotating the finger 30 and the latching member 20 in a counterclockwise direction about the pivot pin 21 thus releasing the end 23 of the trigger 16 from engagement with the cam 27 and the stop 29 of the latching member. The compressive force of the spring 6 tends to bias apart the ends 7 and 19 of the spring and tends to bias the trigger 16 through its finger 18 in a counterclockwise direction, thereby causing the trigger 16 to move inwardly. Release of the reset finger 30 causes this finger and the latching member 20 to turn in a clockwise direction under the action of the coil spring 31, such that the latching member 20 and the trigger 16 will again assume the position shown in Fig. 1. In this construction, a pair of centering pins 35 and 36 are mounted on the driven member plate 9 and spaced slightly inwardly from the expanded position of the arcuate spring 6 for centering the spring relative to the mechanism as the spring is drawn inwardly by its compression under the action of the trigger 16. Furthermore, in order to provide a desired adjustment in the compression of the spring 6 and also to provide necessary adjustment for slight variations in the dimension of the compression springs 6 which may be used in such a driving mechanism, the stop member 8 may be formed with a slot 37 through which a suitable securing device, such as a screw 38 extends for securing the end of the member 8 in different positions to provide for adjustment of the position of this member relative to the projecting end portion 7 of the spring 6.

In Fig. 6, I have shown a modification of the trigger and stop members shown in the other figures of this drawing in which a stop member 39 is pivotally secured by a pivot pin 40 to the driven member plate 9 and is formed with an engaging finger 41 which is adapted to provide a direct mechanical engagement with the projecting end portion 7 of the spring 6. A tongue 42 is formed on the stop member 39 and extends into a complementary groove 43 formed in the adjacent end of the trigger 16, such that a clockwise movement of the trigger 16 produces a counterclockwise movement of the stop 39, thereby providing a quicker compression of the arcuate spring 6 by a simultaneous movement of the two ends of the spring towards each other when the trigger 16 is actuated to its released position. The other parts of this mechanism may be made substantially the same as those shown in the other figures of the drawing and operate in the same manner as explained with respect to these other figures.

The above description has been given while considering the rotation of the driving member as clockwise and that the driving connection is between the frictional engagement of the spring 6 in the groove 4 to the projecting end 7 of the driving element 8 on driven member plate portion 9. It is obvious that for a counterclockwise rotation of the driving member 1, the driving connection would be from the spring 6 in the groove 4 to the projecting end 18 of the trigger member 16 which is pivotally mounted on pin 17 to the driven member and positioned by the latch 20 at step 22. It is also apparent that the functioning of the device is identical for either direction of rotation, and also that either member can be the driver. One advantage of using the device with the members designated as they are in the above description is that the driven member 9 which carries the manual reset member is stationary in the released condition as shown in Fig. 3, while the driving member could continue to rotate, thus facilitating the resetting operation.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. A driving mechanism including a driven member having a driven element formed as a stop, a driving member, an arcuate spring having ends circumferentially spaced apart and arranged in frictional engagement with said driving member for providing a driving connection between said spring, one of said spring ends being arranged for engagement with said driven member stop, means including a trigger mounted on said driven member for engaging the other of said spring ends, and means on said driving member for actuating said trigger above a predetermined torque to bias said arcuate spring ends towards each other whereby said arcuate spring is compressed out of frictional engagement with said driving member releasing said driving connection.

2. A driving mechanism including a driven member having a driven element formed as a stop, an arcuate spring having ends circumferentially spaced apart, one of said spring ends being arranged in engagement with said driven member stop, means on said driven member for engaging the other of said spring ends, a driving member adapted to retain said spring in frictional engagement therewith for providing a driving connection between said driving and driven members, means on said driven member for biasing said spring ends towards each other, and means on said driving member for actuating said biasing means above a predetermining transmitted torque to compress said spring out of frictional engagement with said driving member and to release said driving connection.

3. A driving mechanism including a driven member having a driven element formed as a stop, an arcuate spring having ends circumferentially spaced apart, one of said spring ends being arranged in engagement with said driven member stop, means including a trigger pivotally mounted on said driven member and having a portion adapted to engage the other of said spring ends, a driving member having a surface adapted to retain said spring under compression in frictional engagement therewith for providing a driving connection between said driving and driven members, and means mounted on said driving member for actuating said trigger to bias said spring end engaged by said trigger toward said spring end engaged by said stop whereby said spring is compressed out of frictional engagement with said driving member surface releasing said driving connection.

4. A driving mechanism including a driven member having a driven element formed as a stop, an arcuate spring having ends circumferentially spaced apart, one of said spring ends being arranged in engagement with said driven member stop, means including a trigger pivotally mounted on said driven member and having a portion adapted to engage the other of said spring ends, a driving member having a surface adapted to retain said spring under compression in frictional engagement therewith for providing a driving connection between said driving and driven members, means mounted on said driving member for actuating said trigger to bias said spring end engaged by said trigger toward said spring end engaged by said stop whereby said spring is compressed out of frictional engagement with said driving member surface releasing said driving connection, and means on said driven member for latching said spring in compressed position out of frictional engagement with said driving member surface.

5. A driving mechanism including a driven member having a driven element formed as a stop, an arcuate spring having ends circumferentially spaced apart, one of said spring ends being arranged in engagement with said driven member stop, means including a trigger pivotally mounted on said driven member and having a portion for engaging the other of said spring ends, a driving member having a surface adapted to retain said spring under compression in frictional engagement therewith for providing a driving connection between said driving and driven members, means mounted on said driving member for actuating said trigger to bias said spring end engaged by said trigger toward said spirng end engaged by said stop whereby said spring is compressed out of frictional engagement with said driving member surface releasing said driving connection, and latching means on said driven member for biasing said trigger out of engagement with said actuating means and for latching said spring in compressed position out of frictional engagement with said driving member surface.

6. A driving mechanism including a driven member having a driven element formed as a stop, a driving member, an arcuate spring having ends circumferentially spaced apart and arranged in frictional engagement with said driving member for providing a driving connection between said driving and driven members through said spring, one of said spring ends being arranged for engagement with said driven member stop, means including a trigger on said driven member for engaging the other of said spring ends, means on said driving member for actuating said trigger to bias said arcuate spring ends towards each other whereby said arcuate spring is compressed out of frictional engagement with said second driving member releasing said driving connection, said frictional engagement of said driving member and spring being arranged to cause slippage thereof above a predetermined transmitted torque, means on said driven member for latching said arcuate spring in disengaged position out of frictional engagement with said driving member, and means including a reset device on said driven member for manually biasing said latching means to released position whereby said arcuate spring is reengaged with said driving member to reestablish the driving connection between said driving and driven members through said arcuate spring.

7. A driving mechanism including a driven member, an arcuate spring having ends circumferentially spaced apart, one of said spring ends being arranged in engagement with said driven member, means including a driving member with a surface adapted to retain said spring under compression in frictional engagement therewith, means on said driven member for biasing said arcuate spring ends towards each other whereby said arcuate spring is compressed out of frictional engagement with said driving member releasing said frictional driving connection between said driving and driven members above a predetermined torque causing slippage in said frictional engagement, means on said driven member for latching said arcuate spring in compressed disengaged position out of frictional engagement with said driving member, and means for releasing said arcuate spring whereby said driving member is reengaged to reestablish the driving connection between said driving and driven members.

8. A driving mechanism including a driven member having a driven element formed as a stop, an arcuate spring having ends circumferentially spaced apart with driving means thereon, one of said spring end driving means being arranged in engagement with said driven member stop, means including a trigger pivotally mounted on said driven member having a portion for engaging the other of said spring end driving means, a driving member having a surface adapted to retain said spring under compression in frictional engagement therewith, means mounted on said driving member for actuating said trigger to bias said spring end engaged by said trigger toward said spring end engaged by said stop whereby said spring is compressed out of frictional engagement with said driving member surface, means including a latching finger pivotally mounted on said driven member adapted to be pivoted outwardly by outward movement of said trigger and having an angularly arranged cam surface with a stop at the end thereof for biasing said trigger out of engagement with said actuating means and for latching said spring in compressed position out of frictional engagement with said driving member surface, and means including a reset device on said driven member for biasing said latching finger outwardly whereby said trigger is released therefrom permitting reengagement of said arcuate spring with said driving member surface.

9. A driving mechanism including a driven member having a driven element formed as a stop, an arcuate spring having ends circumferentially spaced apart with driving means thereon, one of said spring end driving means being arranged in engagement with said driven member stop, means including a trigger pivotally mounted on said driven member and having a portion adapted to engage the other of said spring end driving means, a driving member having a surface adapted to retain said spring under compression in frictional engagement therewith, means mounted on said driving member for actuating said trigger to bias said spring end engaged by said trigger toward said spring end engaged by said stop whereby said spring is compressed out of frictional engagement with said driving member surface, latching means on said driven member for biasing said trigger out of engagement with said actuating means and for latching said spring in compressed position out of frictional engagement with said driving member surface, and means on said driven member for releasing said trigger from said latching means permitting reengagement of said arcuate spring with said driving member surface.

10. A driving mechanism including a driven member having a driven element formed as an adjustable stop, an arcuate spring having ends circumferentially spaced apart with driving means thereon, one of said spring end driving means being arranged adjacent said driven member stop, means including a trigger pivotally mounted on said driven member and having a portion for engaging the other of said spring end driving means, a driving member having a surface adapted to retain said spring under compression in frictional engagement therewith, means mounted on said driving member for actuating said trigger to compress said spring out of frictional engagement with said driving member surface whereby said frictional driving connection is released, means including a latching finger pivotally mounted on said driven member adapted to be pivoted outwardly by outward movement of said trigger and having an angularly arranged cam surface with a stop at the end thereof for biasing said trigger out of engagement with said actuating means and for latching said spring in compressed position out of frictional engagement with said driving member surface, and means on said driven member for releasing said trigger from said latching finger permitting reengagement of said arcuate spring with said driving member surface.

11. A driving mechanism including a driven member having a driven element formed as an adjustable stop, an arcuate spring having ends circumferentially spaced apart with driving means thereon, one of said spring end driving means being arranged adjacent and in engagement with said driven member stop, means including a trigger pivotally mounted on said driven member having a portion for engaging the other of said spring end driving means, a driving member having a drum portion with a surface adapted to retain said spring under compression in frictional engagement therewith, means rotatably mounted on said driving member for actuating said trigger to compress said spring out of frictional engagement with said driving member surface whereby said frictional driving connection is released, latching means on said driven member for biasing said trigger out of engagement with said actuating means and for latching said spring in compressed position out of frictional engagement with said driving member drum surface, and means including a resilient spring biased reset device pivotally mounted on said driven member for normally biasing said latching finger inwardly and for manually biasing said latching finger outwardly whereby said trigger is released from said cam stop permitting reengagement of said arcuate spring with said driving member drum surface.

12. A driving mechanism including a driven member having a driven element formed as a stop with a tongue thereon and having a pivotal mounting securing said driven element to said driven member, an arcuate spring having ends circumferentially spaced apart, one of said spring ends being arranged in engagement with said driven member stop, means including a trigger pivotally mounted on said driven member for engaging the other of said spring ends and having a groove therein arranged in engagement with said stop tongue member, means including a driving member with a surface adapted to retain said spring under compression in frictional driving engagement therewith for providing a driving connection between said driving and driven members through said spring and permitting slippage therebetween above a predetermined torque, means on said driving member for actuating said trigger to bias said arcuate spring ends towards each other by turning said stop through said tongue and groove engagement whereby said arcuate spring is compressed out of frictional engagement with said driving member releasing the frictional driving connection between said members above said predetermined torque causing slippage in said frictional engagement, means on said driven member for latching said trigger to hold said arcuate spring in compressed disengaged position out of frictional engagement with said driving member, and means on said driven member for releasing said trigger permitting reengagement of said arcuate spring with said driving member to reestablish the driving connection between said driving and driven members through said arcuate spring.

13. A driving mechanism including a driven member having a driven element formed as a stop, a pivotal mounting securing said driven element to said driven member, said drive element having a slot therein for securing said driven element in different positions relative to said driven member whereby the position of said stop may be changed, an arcuate spring having ends circumferentially spaced apart with driving means thereon, one of said spring end driving means being arranged in engagement with said driven member stop, means including a trigger pivotally mounted on said driven member having a portion for engaging the other of said spring end driving means, a driving member having a drum portion with a surface adapted to retain said spring under compression in frictional engagement therewith, means including a roller rotatably mounted on said driving member for actuating said trigger to bias said spring end engaged by said trigger toward said spring end engaged by said stop whereby said spring is compressed out of frictional engagement with said driving member drum surface releasing the frictional driving connection, latching means on said driven member for biasing said trigger out of engagement with said actuating roller and for latching said spring in compressed position out of frictional engagement with said driving member drum surface, and means including a resilient spring biased reset device pivotally mounted on said driven member for normally biasing said latching finger inwardly and for manually biasing said latching finger outwardly whereby said trigger is released from said cam stop permitting reengagement of said arcuate spring with said driving member drum surface.

14. A driving mechanism including a driven member having a driven element formed as an adjustable stop, an arcuate spring having ends circumferentially spaced apart with driving means thereon, one of said spring end driving means being arranged adjacent and in engagement with said driven member stop, means including a trigger pivotally mounted on said driven member and having a portion for engaging the other of said spring end driving means, a driving member having a drum portion with a surface adapted to retain said spring under compression in frictional engagement therewith, means including a roller rotatably mounted on said driving member for actuating said trigger to bias said spring end engaged by said trigger toward said spring end engaged by said stop whereby said spring is compressed out of frictional engagement with said driving member drum surface releasing said frictional driving connection, means including a latching finger pivotally mounted on said driven member and adapted to be pivoted outwardly by outward movement of said trigger by said roller actuating means, said finger having an angularly arranged cam surface with a stop at the end thereof for biasing said trigger outwardly into engagement with said cam stop and out of engagement with said actuating roller whereby said spring is latched in compressed position out of frictional engagement with said driving member drum surface, and means including a resilient spring biased reset device pivotally mounted on said driven member for normally biasing said latching finger inwardly and for manually biasing said latching finger outwardly whereby said trigger is released from said cam stop permitting reengagement of said arcuate spring with said driving member drum surface.

15. A driving mechanism including a driven member having a driven element formed as a stop, a pivotal mounting securing said drive element to said driven member, said driven element having a slot therein for securing said drive element in different positions relative to said driven member whereby the position of said stop may be changed, an arcuate spring having ends circumferentially spaced apart with driving means thereon, one of said spring end driving means being arranged in engagement with said driven member stop, means including a trigger pivotally mounted on said driven member having a portion for engaging the other of said spring end driving means, a driving member having a surface adapted to retain said spring under compression in frictional engagement therewith, means including a roller rotatably mounted on said driving member for actuating said trigger to compress said spring out of frictional engagement with said driving member surface, means including a latching finger pivotally mounted on said driven member adapted to be pivoted outwardly by outward movement of said trigger by said roller actuating means and having an angularly arranged cam surface with a stop at the end thereof for biasing said trigger out of engagement with said actuating roller whereby said spring is latched in compressed position out of frictional engagement with said driving member surface, and means including a reset device on said driving member for manually biasing said latching finger outwardly whereby said trigger is released permitting reengagement of said arcuate spring with said driving member surface.

16. A driving mechanism including a driven member having a driven element formed as a stop, an arcuate spring having ends circumferentially spaced apart, one of said spring ends being arranged for engagement with said driven member stop, means including a trigger pivotally mounted on said driven member for engaging the other of said spring ends, means including a driving member adapted to retain said spring in frictional engagement therewith for providing a driving connection between said driving and driven members through said spring, means on said driving member for actuating said trigger to bias said arcuate spring ends towards each other whereby said arcuate spring is compressed out of frictional engagement with said driving member releasing said driving connection, said frictional engagement of said drum and spring being arranged to cause slippage thereof above a predetermined torque, means including a latching finger pivotally mounted on said driven member for latching said arcuate spring in disengaged position out of frictional engagement with said driving member, and means including a resiliently biased reset device on said driven member for normally biasing said latching finger inwardly to latched position of said arcuate spring in disengaged position and for manually biasing said latching finger outwardly whereby said arcuate spring is reenergized with said driving member to reestablish the driving connection between said driving and driven members through said arcuate spring.

17. A driving mechanism including a driven member having a driven element formed as a stop, a pivotal mounting securing said drive element to said driven member, said driven element having a slot therein for securing said drive element in different positions relative to said driven member for changing the position of said stop, an arcuate spring having ends circumferentially spaced apart with driving means thereon, one of said spring end driving means being arranged adjacent and in engagement with said driven member stop, means including a trigger pivotally mounted on said driven member having a portion for engaging the other of said spring end driving means, a driving member having a surface adapted to retain said spring under compression in frictional engagement therewith, means including a roller rotatably mounted on said driving member for actuating said trigger to compress said spring out of frictional engagement with said driving member surface whereby said frictional driving connection is released, means including a latching finger pivotally mounted on said driven member adapted to be pivoted outwardly by outward movement of said trigger by said roller actuating means and having an angularly arranged cam surface with a stop at the end thereof for biasing said trigger out of engagement with said actuating roller and for latching said spring in compressed position out of frictional engagement with said driving member surface, and means including a resilient spring biased reset device pivotally mounted on said driven member for normally biasing said latching finger inwardly and for manually biasing said latching finger outwardly whereby said trigger is released from said cam stop permitting reengagement of said arcuate spring with said driving member surface.

18. A driving mechanism including a driven member having a driven element formed as a stop with a tongue thereon, a pivotal mounting securing said drive element to said drive member, an arcuate spring having ends circumferentially spaced apart, one of said spring ends being arranged in engagement with said driven member stop, means including a trigger pivotally mounted on said drive member for engaging the other of said spring ends and having a groove therein arranged in engagement with said stop tongue member, means including a driving member with a surface adapted to retain said spring under compression in frictional engagement therewith for providing a driving connection between said drive members through said spring and permitting slippage therebetween above a predetermined torque, means on said driving member for actuating said trigger to bias said arcuate spring ends towards each other by turning said stop through said tongue and groove engagement whereby said arcuate spring is compressed out of frictional engagement with said driving member drum surface releasing the frictional driving connection between said drive members above said predetermined torque causing slippage in said frictional engagement, means including a latching finger pivotally mounted on said driven member adapted to be pivoted outwardly by outward movement of said trigger by said actuating means and having an angularly arranged cam surface for biasing and trigger outwardly out of engagement with said actuating means and for latching said arcuate spring in compressed disengaged position out of frictional engagement with said second drive member, and means on said driven member for normally biasing said latching finger inwardly to assist in latching said arcuate spring in disengaged position and for manually biasing said latching finger outwardly for releasing said trigger whereby said arcuate spring is reengaged with said driving member to reestablish the driving connection between said drive members through said arcuate spring.

19. A driving mechanism including a driven member having a driven element formed as a stop with a tongue thereon, a pivotal mounting securing said drive element to said driven member, an arcuate spring having ends circumferentially spaced apart, one of said spring ends being arranged adjacent and in engagement with said driven member stop, means including a trigger pivotally mounted on said driven member and having a portion for engaging the other of said spring ends and a groove therein arranged in engagement with said stop tongue member, means including a driving member having a drum portion with a surface adapted to retain said spring under compression in frictional engagement therewith for providing a driving connection between said driving and driven members through said spring and permitting slippage therebetween above a predetermined torque, means on said driving member for actuating said trigger to bias said arcuate spring end engaged by said trigger toward said spring end engaged by said stop and turning said stop through said tongue and groove engagement whereby the end of said arcuate spring engaged by said stop is moved in the opposite direction compressing said arcuate spring out of frictional engagement with said driving member drum surface and releasing the frictional driving connection between said driving and driven members above said predetermined torque causing slipping in said frictional engagement of said drum and spring, means including a latching finger pivotally mounted on said driven member adapted to be pivoted outwardly by outward movement of said trigger by said trigger actuating means and having an angularly arranged cam surface for biasing said trigger outwardly out of engagement with said actuating means and for latching said arcuate spring in compressed disengaged position out of frictional engagement with said driving member drum surface, and means including a reset device pivotally mounted on said driven member for normally biasing said latching finger inwardly to assist in latching said arcuate spring in disengaged position and for manually biasing said latching finger outwardly for releasing said trigger therefrom whereby said arcuate spring is reengaged with said driving member drum surface to reestablish the driving connection between said driving and driven members through said arcuate spring.

20. A driving mechanism including a driven member formed as a plate and having a driven element formed as a stop, a pivotal mounting securing said drive element to said driven member, said driven element having a slot therein with means for securing said drive element in different positions relative to said driven member whereby the position of said stop is changed, an arcuate spring having ends circumferentially spaced apart with driving means thereon, one of said spring end driving means being arranged adjacent and in engagement with said driven member stop, means including a trigger pivotally mounted on said driven member having a portion for engaging the other of said spring end driving means, means including a driving member having a drum portion with a surface adapted to retain said spring under compression in frictional engagement therewith for providing a driving connection between said driving and driven members through said spring, means including a roller rotatably mounted on said driving member for actuating said trigger to bias said arcuate spring end engaged by said trigger toward said spring end engaged by said stop whereby said arcuate spring is compressed out of frictional engagement with said driving member drum surface releasing said driving connection, said frictional engagement of said drum and spring being arranged to cause slippage thereof above a predetermined torque, means including a latching finger pivotally mounted on said driven member adapted to be pivoted outwardly by outward movement of said trigger by said roller actuating means and having an angularly arranged cam surface with a stop at the end thereof for biasing said trigger outwardly into engagement with said cam stop and out of engagement with said actuating roller and for latching said arcuate spring in compressed disengaged position out of frictional engagement with said driving member drum surface, and means including a resilient coil spring biased reset device pivotally mounted on said driven member for normally biasing said latching finger inwardly to assist in latching said arcuate spring in disengaged position and for manually biasing said latching finger outwardly whereby said trigger is released permitting reengagement of said arcuate spring with said driving member drum surface to reestablish the driving connection between said driving and driven members through said arcuate spring.

21. A driving mechanism including a driven member formed as a plate and having a driven element formed as a stop with a tongue thereon, a pivotal mounting securing said driven element to said driven member, an arcuate spring having ends circumferentially spaced apart with driving means thereon, one of said spring end driving means being arranged adjacent and in engagement with said driven member stop, means including a trigger pivotally mounted on said driven member having a portion for engaging the other of said spring end driving means and having a groove therein arranged in engagement with said stop tongue member, means including a driving member having a drum portion with a surface adapted to retain said spring under compression in frictional engagement therewith for providing a driving connection between said driving and driven members through said spring and permitting slippage therebetween above a predetermined transmitted torque, means including a roller rotatably mounted on said driving member for actuating said trigger to bias said arcuate spring end engaged by said trigger toward said spring end engaged by said stop and turning said stop through said tongue and groove engagement whereby the end of said arcuate spring engaged by said stop is moved in the opposite direction compressing said arcuate spring out of frictional engagement with said driving member drum surface and releasing the frictional driving connection between said driving and driven members above said predetermined torque causing slippage in said frictional engagement of said drum and spring, means including a latching finger pivotally mounted on said driven member adapted to be pivoted outwardly by outward movement of said trigger by said roller actuating means and having an angularly arranged cam surface with a stop at the end thereof for biasing said trigger outwardly into engagement with said cam stop and out of engagement with said actuating roller and for latching said arcuate spring in compressed disengaged position out of frictional engagement with said driving member drum surface, and means including a resilient coil spring biased reset device pivotally mounted on said driven member for normally biasing said latching finger inwardly to assist in latching said arcuate spring in disengaged position and for manually biasing said latching finger outwardly whereby said trigger is released permitting reengagement of said arcuate spring with said driving member drum surface to reestablish the driving connection between said driving and driven members through said arcuate spring.

22. A driving mechanism including a driven member, a driving member, an arcuate spring having ends circumferentially spaced apart and arranged in frictional engagement with said driving member for providing a driving connection between said members through said spring, one of said spring ends being arranged for engagement with said driven member, means on said driven member for compressing said arcuate spring out of frictional engagement with said driving member whereby said driving connection is released above a predetermined torque and automatic re-establishment of said connection is prevented, and means on said driven member for manually releasing said arcuate spring to re-establish said frictional driving connection.

23. A driving mechanism including a driven member having a driven element formed as a stop, an arcuate spring having ends circumferentially spaced apart, one of said spring ends being arranged in engagement with said driven member stop, means including a trigger on said driven member for engaging the other of said spring ends, a driving member adapted to retain said spring in frictional engagement therewith for providing a driving connection between said driving and driven members, and means on said driving member for actuating said trigger above a predetermined torque to bias said spring ends towards each other whereby said spring is compressed out of frictional engagement with said driving member releasing said driving connection.

HUGH M. STEPHENSON.

REFERENCES CITED

The following references are of record in the file of this patent:

UNITED STATES PATENTS

| Number | Name | Date |
| --- | --- | --- |
| 775,063 | Dexter | Nov. 15, 1904 |
| 1,677,961 | Fay | July 24, 1928 |
| 2,012,418 | Burke | Aug. 27, 1935 |

FOREIGN PATENTS

| Number | Country | Date |
| --- | --- | --- |
| 4,785 | Great Britain | Feb. 23, 1897 |